(12) United States Patent
Tsukamoto et al.

(10) Patent No.: US 8,704,485 B1
(45) Date of Patent: Apr. 22, 2014

(54) BATTERY PACK SYSTEM

(75) Inventors: Hisashi Tsukamoto, Santa Clarita, CA (US); Taison Tan, Pasadena, CA (US)

(73) Assignee: Quallion LLC, Sylmar, CA (US)

( * ) Notice: Subject to any disclaimer, the term of this patent is extended or adjusted under 35 U.S.C. 154(b) by 1687 days.

(21) Appl. No.: 11/603,781

(22) Filed: Nov. 22, 2006

Related U.S. Application Data

(60) Provisional application No. 60/740,202, filed on Nov. 28, 2005.

(51) Int. Cl.
*H02J 7/00* (2006.01)
(52) U.S. Cl.
USPC .............. 320/112; 320/114; 429/99; 429/100
(58) Field of Classification Search
USPC .............................. 320/112, 114; 429/99, 100
See application file for complete search history.

(56) References Cited

U.S. PATENT DOCUMENTS

| | | | | |
|---|---|---|---|---|
| 6,140,927 | A  * | 10/2000 | Whitmire | 340/636.15 |
| 6,377,432 | B1 * | 4/2002 | Hashimoto | 361/104 |
| 6,479,185 | B1 * | 11/2002 | Hilderbrand et al. | 429/148 |
| 2003/0013009 | A1 * | 1/2003 | Dansui et al. | 429/120 |

* cited by examiner

*Primary Examiner* — Samuel Berhanu
(74) *Attorney, Agent, or Firm* — Gavrilovich, Dodd & Lindsey, LLP

(57) ABSTRACT

A battery pack system is disclosed. The battery pack system includes a plurality of battery pack modules that are each configured to be concurrently and removably attached to a base. Each battery pack module includes batteries arranged in a plurality of parallel groups that are connected in series. Each parallel group includes a plurality of batteries connected in parallel. Additionally or alternately, the base has electronics that connect the battery pack modules in a plurality of system parallel groups that are connected in series. Each system parallel group includes a plurality of battery pack modules connected in parallel.

21 Claims, 10 Drawing Sheets

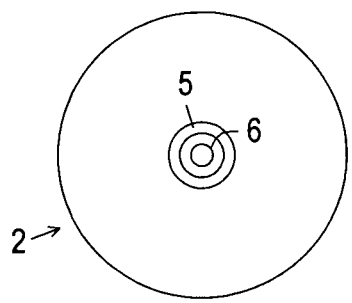
Figure 1B
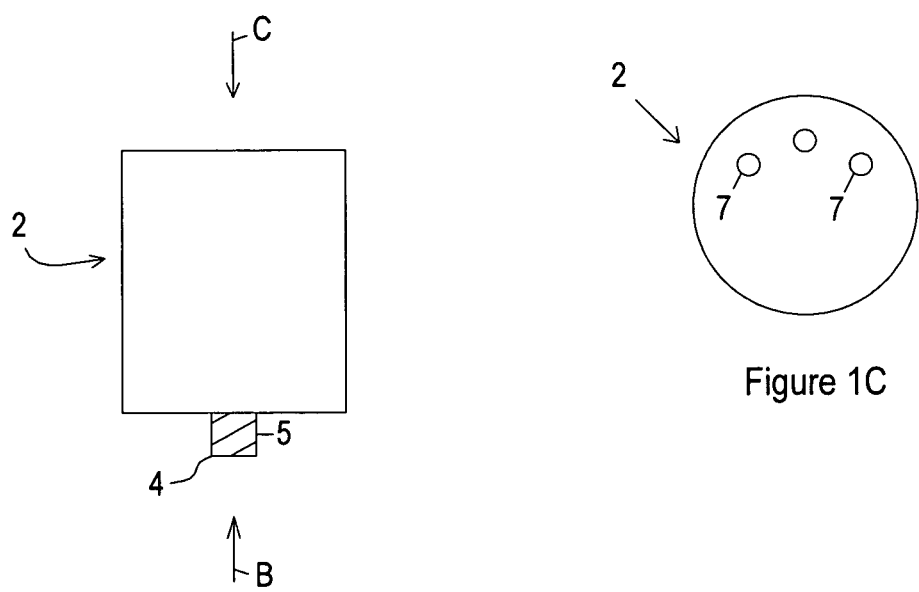
Figure 1C
Figure 1A

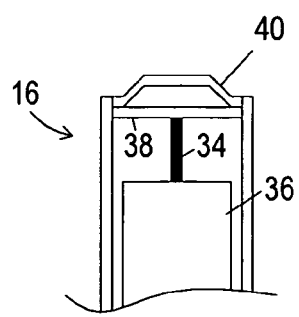
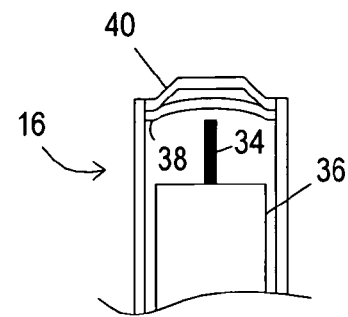
Figure 2A
Figure 2B

BATTERY PACK SYSTEM

REFERENCE TO RELATED APPLICATIONS

This application claims the benefit of U.S. Provisional Patent Application Ser. No. 60/740,202, filed on Nov. 28, 2005, entitled "Battery Pack System," and incorporated herein in its entirety.

FIELD

The present invention relates to power sources and more particularly to interconnection of multiple power sources.

BACKGROUND

As batteries play a larger role in powering the movement, of vehicles such as cars, systems that employ a plurality of batteries have been designed. However, these systems have not adequately addressed the drop in performance that can result when one or more of these batteries fails. As a result, there is a need for an improved battery system

SUMMARY

A battery pack system is disclosed. The battery pack system includes a plurality of battery pack modules that are each configured to be concurrently and removably attached to a base. Each battery pack module includes batteries arranged in a plurality of parallel groups that are connected in series. Each parallel group includes a plurality of batteries connected in parallel. Additionally or alternately, the base has electronics that connect the battery pack modules in a plurality of system parallel groups that are connected in series. Each system parallel group includes a plurality of battery pack modules connected in parallel.

In some instances, each of the parallel groups includes one or more battery pack modules that are high power sources and one or more battery pack modules that are low power sources. The high power sources have a gravimetric power density that is more than the gravimetric power density of the low power sources. Additionally, the low power sources can have more capacity than the high power sources.

In some instances, the battery pack modules include electronics configured to diagnose a fault condition for a battery in the battery pack module and to indicate the fault condition to an operator. Additionally or alternately, the base can include electronics for identifying a fault condition in a battery pack module. The base can also include electronics for indicating the identified fault condition to an operator.

BRIEF DESCRIPTION OF THE FIGURES

FIG. 1A through FIG. 1C illustrate a battery pack module that houses a plurality of batteries. FIG. 1A is a sideview of the battery pack module.

FIG. 1B is a sideview of the battery pack module taken looking in the direction of the arrow labeled B in FIG. 1A.

FIG. 1C is a sideview of the battery pack module taken looking in the direction of the arrow labeled C in FIG. 1A.

FIG. 2A and FIG. 2B illustrate operation of a current interruption device. FIG. 2A is a cross section of a battery before the threshold pressure is reached. FIG. 2B is a cross section of the battery after the threshold pressure is reached.

DESCRIPTION

Figure 1D:
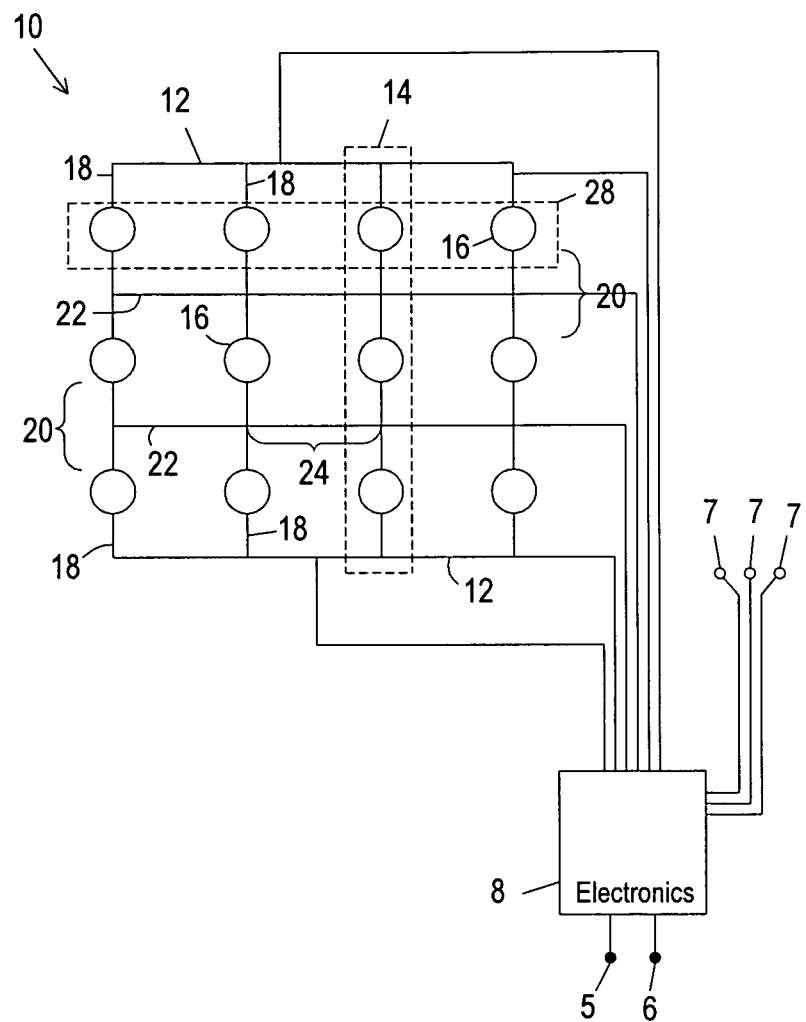
FIG. 1D is a schematic diagram of the battery pack module of FIG. 1A through FIG. 1C.

The battery pack system includes a plurality of battery pack modules that are each configured to be concurrently and removably attached to a base. The base can have electronics that connect the battery pack modules in a plurality of system parallel groups that are connected in series. Each system parallel group includes a plurality of battery pack modules connected in parallel. This arrangement of battery pack modules allows the battery pack system to be recharged and charged such that the capacity of the battery pack system is substantially retained after failure of a battery pack module. Accordingly, the battery pack system is suitable for surviving failure of a battery pack module in the battery pack system.

Each battery pack module can include batteries arranged in a plurality of parallel groups connected in series. Each parallel group includes a plurality of batteries connected in parallel. This arrangement of battery pack modules allows each battery pack module to be recharged and charged such that the capacity of a battery pack module is substantially retained after failure of a battery in the battery pack module.

In some instances, each system parallel group includes one or more high power sources and one or more low power sources. The high power sources have a gravimetric power density that is more than the gravimetric power density of the low power sources. Additionally, the low power sources can have more capacity than the high power sources. During discharge of the battery pack system, the current flows primarily from the high power sources during high power applications such as pulsing. When the power demands on the battery system drops, the portion of the current provided by the low power sources increases. During the high power application, the low power sources will have discharged less energy than the high power sources. As a result, the high power sources will be associated with a higher voltage drop than the low power sources. However, because the battery pack modules in the same parallel group are at the same voltage, the low power sources will recharge the high power sources. This recharge permits the battery assembly to repeatedly satisfy the requirements of high power applications.

In some instances, the battery pack modules include electronics configured to diagnose a fault condition for a battery in the battery pack module and to indicate the fault condition to an operator. Additionally or alternately, the base can include electronics for identifying a fault condition in a battery pack module. The base can also include electronics for indicating the identified fault condition to an operator. Since the battery pack modules are removably attachable to the base, the operator can change faulty battery pack modules in response to the indication of the fault condition.

FIG. 1A through FIG. 1C illustrate a battery pack module 2 that houses a plurality of batteries. FIG. 1A is a sideview of the battery pack module 2. FIG. 1B is a sideview of the battery pack module 2 taken looking in the direction of the arrow labeled B in FIG. 1A. FIG. 1C is a sideview of the battery pack module 2 taken looking in the direction of the arrow labeled C in FIG. 1A. The battery pack module 2 includes a protrusion 4 that includes a first terminal 5 and a second terminal 6. The first terminal 5 is positioned on the outside of the protrusion 4. In some instances, the first terminal 5 includes threads. The second terminal 6 is positioned at an end of the protrusion 4.

The battery pack module 2 includes one or more status indicators 7 for indicating the status of the battery pack module 2. Suitable status indicators 7 include, but are not limited to, light emitting diodes (LEDs), thermal labels that change color in response to temperature changes, digital displays, and liquid crystal displays. The status indicators 7 can indicate that the battery pack module 2 is ready for use, is discharged, is charged, needs charging, is charging, is exposed to excessively high voltage, is exposed to excessively high current, has shorted, is exposed to undesirably high temperatures and/or undesirably low temperatures, is overcharged, overdischarged, and/or has experienced mechanical failure, impact or shock. Different status indicators 7 can be associated with different conditions. For instance, one status indicator 7 can be associated with the need to charge the battery pack module 2 while a different status indicator 7 can be associated with a charged battery pack module 2. In one example, the status indicators 7 are different colored LEDs. A green LED can indicate that the battery pack module 2 is ready for use and a red LED can indicate that a fault has occurred.

Although not shown, the battery pack module 2 can include a serial number or other type of identifier that can be seen from outside of the battery pack module 2.

FIG. 1D is a schematic diagram of battery pack module 2 of FIG. 1A through FIG. 1C. The battery pack module 2 includes electronics 8 in electrical communication with the status indicators 7, the first terminal 5 and the second terminal 6 disclosed in FIG. 1A through FIG. 1C, and a battery system 10.

The battery system 10 includes two primary parallel lines 12 that connect three series groups 14 in parallel. The series groups 14 each include three batteries 16 connected in series. Primary series lines 18 each provide electrical communication between a series group 14 and a primary parallel line 12 and secondary series lines 20 provide electrical communication between the batteries 16 connected in series.

The battery pack module 2 also includes a plurality of secondary parallel lines 22. The secondary parallel lines 22 each include one or more cross lines 24 that provide electrical communication between the secondary series lines 20 in different series groups 14. Accordingly, each secondary parallel line 22 provides a parallel connection between the batteries 16 in different series group 14. For instance, each secondary parallel line 22 provides electrical communication between different series groups 14 such that a battery 16 in one of the series groups 14 is connected in parallel with a battery 16 in the other series groups 14. Because a single secondary parallel line 22 only provides one of the parallel connections, another connection is needed to connect batteries 16 in parallel. The other parallel connection can be provided by another secondary parallel line 22 or by a primary parallel line 12. Each of the batteries 16 connected in parallel belongs to a parallel group 28. Accordingly, the battery pack module 2 of FIG. 1D includes three parallel groups 28.

Figure 1E:
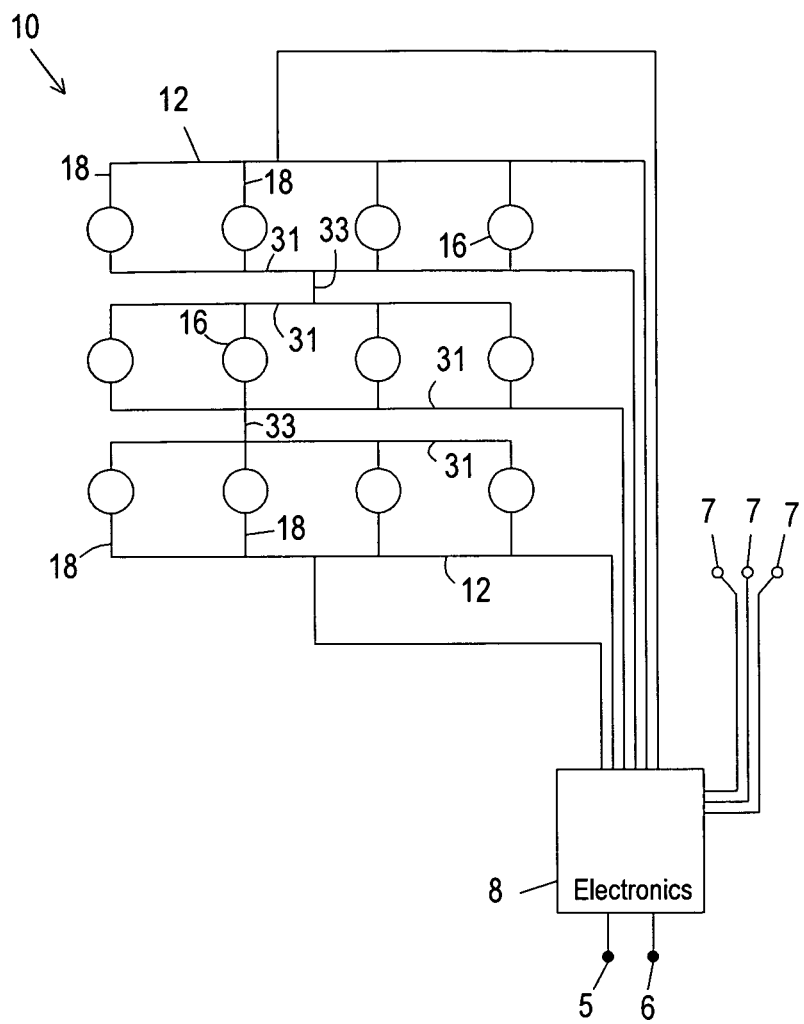
FIG. 1E is an alternate schematic for the batteries in the battery pack of FIG. 1D.

The battery system of FIG. 1D can also be illustrated as a plurality of parallel groups connected in series as shown in FIG. 1E. In FIG. 1E, two parallel lines 31 connected by a series line 33 replace the secondary parallel lines of FIG. 1D. The schematic of FIG. 1D may be preferable because all of the pack current must pass through the series lines of FIG. 3B. As a result, the series lines may need to be larger than other lines in the battery pack and accordingly may add weight to the battery pack.

The battery pack module 2 of FIG. 1D can be scaled to include more batteries or fewer batteries. For instance, battery pack module 2 can include four or more batteries, twelve or more batteries, twenty-five or more batteries, eighty-one or more batteries, one hundred or more batteries. The number of batteries in each parallel group can be the same or different from the number of batteries in each series group 14. The number of batteries in each series group 14 can be increased in order to increase the voltage of the system or decreased in order to decrease the voltage of the system. Each series group 14 can include two or more batteries; four or more batteries; more than eight batteries; or fifteen or more batteries. The number of series groups 14 can be increased for applications that require higher power levels or decreased for applications that require lower power levels. In one embodiment, the battery pack module includes only one parallel group and no series groups. The battery pack module can include two or more series groups; four or more series groups; ten or more series groups; or fifteen or more series groups 70.

The connections between the batteries can be standard methods for connecting batteries. The connections between the batteries and the conductors can be made using connection methods that are suitable for the amount of current and power that will be delivered by the battery. For instance, conductors can be connected to a battery by welding. Additionally or alternately, one or more of the primary parallel lines and the connected primary series lines can optionally be integrated into a single line. For instance, a single wire, cable, piece of sheet metal, or metal bar can serve as both a primary parallel line and as the connected primary series lines. Additionally or alternately, one or more the secondary parallel lines and the connected secondary series lines can optionally be integrated into a single line. For instance, a single wire, cable, piece of sheet metal, or metal bar can serve as both a secondary parallel line and as the connected secondary series lines.

Although FIG. 1D illustrates the secondary parallel lines 22 providing electrical communication between the series groups 14 such that a battery 16 in one of the series groups 14 is connected in parallel with a battery 16 in each of the other series groups 14, the secondary parallel lines 22 can provide electrical communication between the series groups 14 such that a battery 16 in one of the series groups 14 is connected in parallel with a battery 16 in a portion of the other series groups 14.

The battery pack module 2 can include other electrical connections between the primary parallel lines 12. For instance, other batteries and/or series groups can be connected between the primary parallel lines 12 but not otherwise electrically connected to the illustrated series groups. Further, the battery system 10 can include other components.

The electronics 8 are configured to control and/or monitor the discharge and charge of the battery pack module 2. Suitable electronics 8 include, but are not limited to, firmware, hardware and software or a combination thereof. Examples of suitable electronics 8 include, but are not limited to, analog electrical circuits, digital electrical circuits, processors, microprocessors, digital signal processors (DSPs), computers, microcomputers, ASICs, and discrete electrical components, or combinations suitable for performing the required control functions. In some instances, the electronics 8 include one or more memories and one or more processing units such as a CPU. The one or more memories can include instructions to be executed by the processing unit during performance of the control and monitoring functions.

In some instances, the electronics 8 exclude recharging circuitry. A recharging circuit can generate considerable amount of heat in the battery pack module 2. This heat can adversely affect the life and performance of the batteries in the battery pack module 2. As a result, the battery pack module 2 can be recharged by employing a power source and recharging electronics 8 external to the battery pack module 2 to apply a potential between the first terminal 5 and the second terminal 6.

The electronics 8 can include a battery protection circuit that monitors the charging and recharging of the battery pack module 2 so as to detect fault conditions in the battery pack module 2. One example of a fault condition is application of excessive and potentially damaging voltage to one or more batteries while recharging the battery pack module 2. For instance, a fault condition can occur by applying a voltage exceeding a threshold voltage across a battery, across one of the parallel groups and/or across the battery system 10.

Another example of a fault condition includes applying excessive and potentially damaging current to one or more batteries during the charge of the battery pack module 2. For instance, a fault condition can occur by applying a current exceeding a threshold current across a battery, across one of the parallel groups and/or across the battery system 10. Another example of a fault condition includes allowing the potential of one or more batteries to fall to a level that would damage the function and/or rechargeability of the battery. For instance, a fault condition can occur by discharging the battery pack module 2 until the voltage across one or more of the batteries falls below a voltage threshold.

In the event of a fault condition, the battery protection circuit can stop the current flow through the battery assembly. For instance, the electronics 8 can include a switch that stops current flow through the battery pack module 2 when the switch is open. The electronics 8 can open the switch in the event the fault condition occurs. A suitable switch includes, but is not limited to, a field-effect transistor (FET). Additionally or alternatively, the electronics 8 can activate the appropriate status indicator(s) 7. In some instances, the electronics 8 can activate the appropriate status indicator(s) 7 before a fault condition is achieved to inform an operator that a fault condition is approaching. For instance, a fault condition can be associated with two threshold. The electronics 8 can activate a status indicator 7 when the first threshold is crossed can open the switch and/or activate another status indicator 7 when the second threshold is crossed. In some instances, the battery pack module 2 includes a status indicator 7 that indicates that no fault conditions exist or are approaching. When no fault conditions exist or are approaching, the electronics 8 can activate the appropriate status indicator(s) 7.

The battery pack module 2 can include electronics 8 in addition to the electronics 8 illustrated in FIG. 1D. For instance, the battery pack module 2 can include electronics 8 for independently monitoring each of the batteries. As a result, the battery pack module 2 will require additional connections between the electronics 8 and the battery system 10. FIG. 1D illustrates connections between the parallel lines and the electronics 8. Since each of the batteries connected in parallel has the same voltage, the electronics 8 can employ the illustrated connections to concurrently monitor voltage of each of the batteries connected in parallel by two parallel lines. In instances where the voltage of the batteries is not monitored, the battery pack module 2 may not include the illustrated connections. Additionally, the battery pack module can include ammeters and/or voltmeters as needed to perform the functions described above.

The battery pack module 2 can be configured to provide more than 9 V or more than 12 V. Additionally or alternately, the battery pack modules 2 can be configured to provide more than 50 watt-hours, more than 100 watt-hours or more than 240 watt-hours. Many of the advantages associated with the battery pack module 2 do not become evident until the battery pack module 2 is used for applications requiring high power levels. As a result, the battery pack module 2 is suitable for high power applications such as powering the movement of vehicles such as trucks, cars and carts. For these high power applications, the battery pack module 2 is preferably configured to provide more than 18 V, more than 24 V or more than 32 V. Additionally or alternately, the battery pack module 2 is preferably configured to provide more than 240 watt-hours, more than 500 watt-hours or more than 1000 watt-hours. In some instances, the above performance levels are achieved using a battery pack module 2 where the batteries in the series groups 14 each have a voltage of less than 14 V, 10 V or 5 V.

In some instances, one or more of the batteries are configured to provide more than 9 V or more than 12 V. Additionally or alternately, the batteries can be configured to provide more than 50 watt-hours, more than 100 watt-hours or more than 240 watt-hours. When the battery pack module 2 is used for applications requiring high power levels such as powering the movement of vehicles such as trucks, cars and carts, the batteries are preferably configured to provide more than 18 V, more than 24 V or more than 32 V. Additionally or alternately, the batteries are preferably configured to provide more than 240 watt-hours, more than 500 watt-hours or more than 1000 watt-hours.

The battery system 10 can include battery disconnection devices in series with the batteries. The battery disconnection devices can stop or reduce current flow through a battery to prevent damage to the battery or to the battery system 10. The battery disconnection devices can address undesirable increases in pressure in the battery, undesirable increases in the temperature of a battery, and/or undesirable current levels through a battery.

Figure 1F:
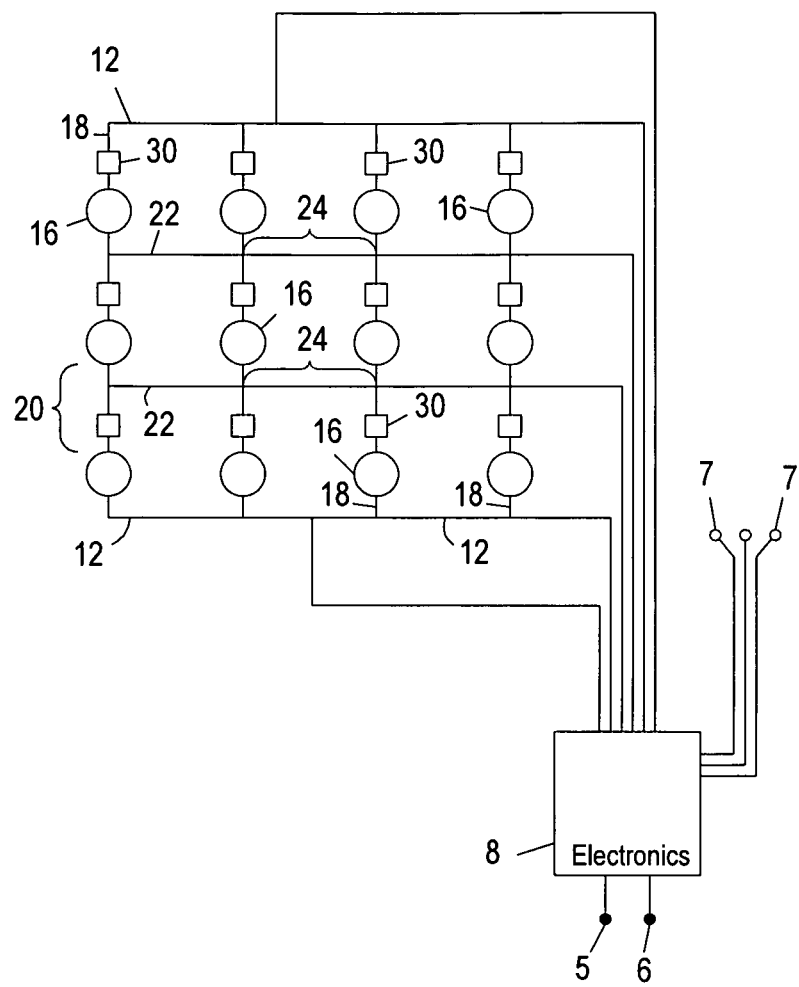
FIG. 1F is a schematic diagram of the battery pack module of FIG. 1A through FIG. 1C where a fuse is positioned in series with each of the batteries.

Suitable battery disconnection devices for addressing undesirable current increases in a battery include fuses. For instances, fuses can be positioned such that if a battery shorts, the battery is no longer in electrical communication with the rest of the batteries in the battery system 10. Accordingly, the fuses can prevent a cell that shorts in a parallel group from shorting the other cells in the parallel group. As an example, FIG. 1F illustrates a battery disconnection device 30 in series with each of the batteries. A fuse can serve as the battery disconnection device 30 of FIG. 1F. Suitable fuses 30 include, but are not limited to, traditional fuse devices and bi-metal switching devices.

Suitable battery disconnection devices for addressing undesirable pressure increases in a battery include current interruption devices and/or relief valves such as burst discs. An example current interruption device interrupts current flow from a battery once the pressure in the battery exceeds a threshold pressure. FIG. 2A and FIG. 2B illustrate operation of a current interruption device. FIG. 2A is a cross section of a battery before the threshold pressure is reached. FIG. 2B is a cross section of the battery after the threshold pressure is reached. The battery includes a tab 34, an electrode assembly 36, an electrically conducting diaphragm 38 and a cap 40 that serves as a terminal for the battery. The tab 34 is in electrical communication with one or more anodes in the electrode assembly 36 or with one or more cathodes in the electrode assembly 36. During operation of the battery, the diaphragm 38 is in contact with the tab 34 as illustrated in FIG. 2A. The diaphragm 38 is electrically conductive and provides electrical communication between the cap 40 and the tab 34. In the event the pressure in the battery rises above the threshold pressure, the diaphragm 38 deforms such that the contact between the tab 34 and the diaphragm 38 is broken. The break in contact between the tab 34 and the diaphragm 38 stops the flow of current through the battery.

Suitable battery disconnection devices for addressing undesirable pressure increases in a battery include positive temperature coefficient (PTC) resistors. A PTC resistor usually includes a material with temperature dependent electrical conductivity. For instance, the conductivity of the PTC material can decrease as the temperature increases. As a result, the current through the battery decreases as the battery temperature decreases. A PTC material can be coated between the active material and the substrate in an electrode or mixed in a slurry with the active material and coated on the substrate along with the active material. Additionally or alternately, the material can be employed as any of the other current carrying battery connections. Examples of a material suitable for use as a PTC include, but are not limited to, high-density polyethylene (melting point: 130 to 140.degree.), low-density polyethylene (melting point: 110 to 112.degree. C.), a polyurethane elastomer (melting point: 140-160.degree. C.), and polyvinyl chloride (melting point: about 145.degree. C.).

Another suitable battery disconnection devices for addressing undesirable temperature increases in a battery include electronics for disconnecting the battery in response to temperature increases. For instance, the electronics 8 can employ one or more temperature measuring devices to monitor the temperature in the battery pack. For instance, the electronics 8 can employ one or more temperature measuring devices to monitor the temperature of one or more of the batteries or each of the batteries. Additionally, the electronics can be configured to operate switches that serve as the battery disconnection devices 30 of FIG. 1F. Accordingly, the electronics can employ one or more of the switches to disconnect one or more of the batteries in the event that one or more of the temperature measurement devices indicate that the temperature satisfies one or more criteria. Examples of a suitable criterion include the temperature exceeding a threshold. Examples of suitable temperature measuring devices include, but are not limited to, thermocouples.

Figure 3A:
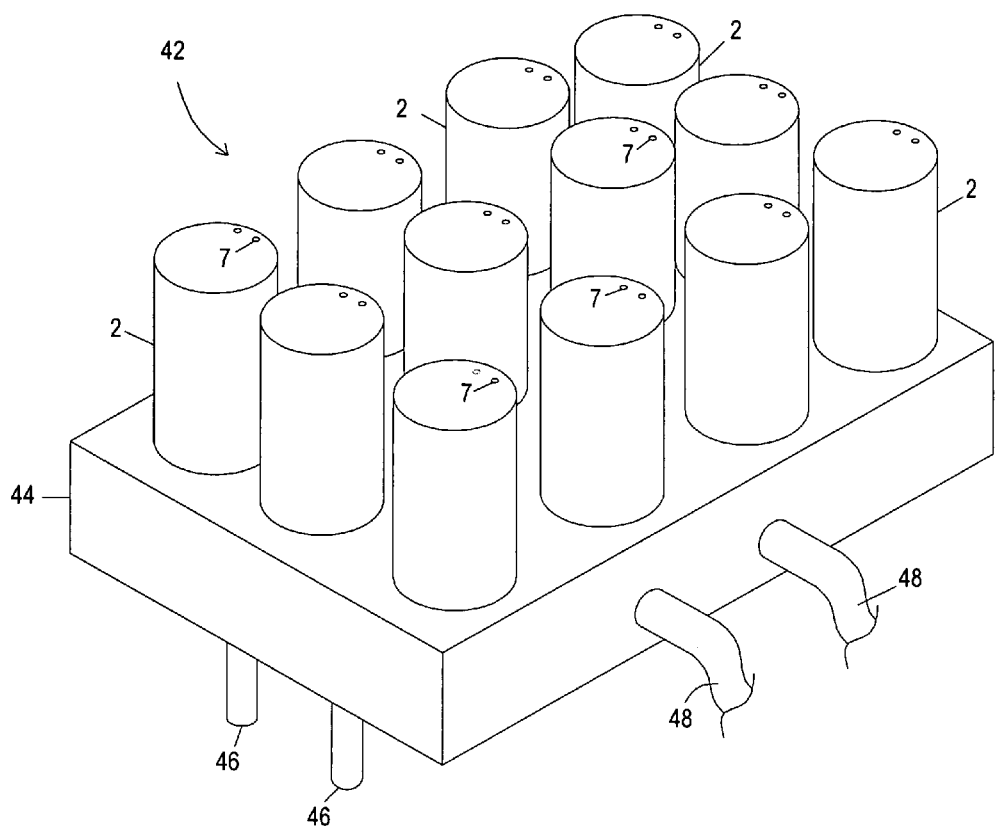
FIG. 3A is a perspective view of a battery pack system. The battery pack system includes a plurality of battery pack modules coupled with a base.

FIG. 3A is a perspective view of a battery pack system 42. The battery pack system 42 includes a plurality of battery pack modules 2 coupled with a base 44. The base 44 includes terminals 46 configured to be coupled to the device to be powered by the battery pack system 42. Although the terminals are shown as protruding from the bottom of the base 44, the terminals 46 can be positioned on other sides of the base 44. Additionally, the terminals 46 need not protrude from the base 44, for instance, the terminals 46 can be flat and flush with a side of the base 44 or the terminals 46 can be positioned in a socket that extends into the base 44 or in sockets that extend into the base 44.

The base 44 optionally includes one or more system connectors 48. The system connectors 48 can be employed to connect the battery pack system 42 to another battery pack system 42. The system connectors 48 each include one or more electrical conductors such as wires. The electrical conductors can be configured to provide electrical communication between connected battery pack systems 42.

Figure 3B:
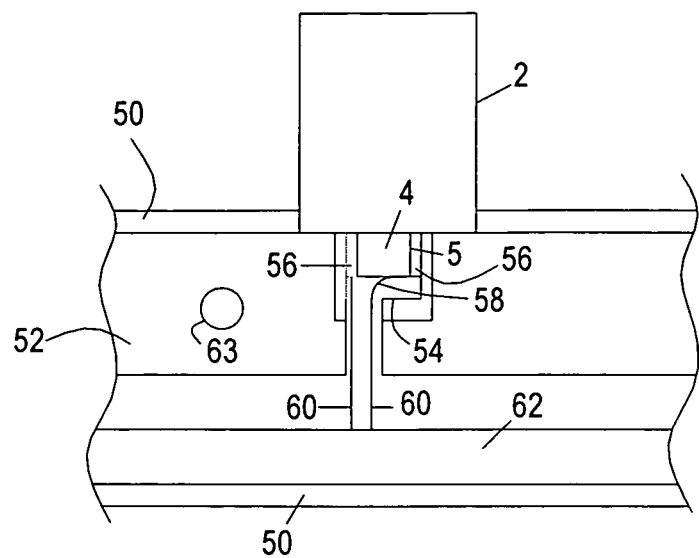
FIG. 3B and FIG. 3C are cross sections of the battery pack system of FIG. 3A. The cross sections illustrate the interface between a battery pack module and the base.

The battery pack modules 2 are configured to be removably coupled with the base 44. FIG. 3B is a cross section of the battery pack system 42 illustrating the interface between a battery pack module 2 and the base 44. The base 44 includes a case 50 that houses electronics and a temperature control device 52. A socket extends into the base 44. An electrical insulator 54 and electrical contacts 56, 58 are positioned in the socket. Electrical conductors 60 extend from the electrical contacts through the temperature control device to electronics 62 housed in the case 50 and provide electrical communication between the electrical contacts and the electronics 62. Suitable electrical conductors 60 include wires and insulated wires.

The insulator can be configured to insulate a first electrical contact 56 from the plate and to insulate a second electrical contact 58 from the plate. For instance, the insulator can be positioned in the socket between the first electrical contact 56 and the temperature control device 52 and between the second electrical contact 58 and the temperature control device 52 as shown in FIG. 3B. The first electrical contact 56 can surround the protrusion 4 on the battery pack module 2 and can be in contact with the first terminal 5 on the battery pack module 2. The second electrical contact 58 can be configured to contact the second terminal 6 on the battery pack module 2 upon insertion of the protrusion 4 on the battery pack module 2 into the socket.

In some instance, the first electrical contact 56 includes threads that are complementary to threads on the first terminal 5 of the battery pack module. As a result, the battery pack module 2 can be threaded into and out of the socket in the base 44. This arrangement permits the battery pack modules 2 to be easily removed and replaced. In the event that one or more status indicators 7 on a battery pack module 2 indicate a fault conditions such as a short in one or more of the battery pack modules 2, the battery pack module 2 can be removed and replaced with an intact battery pack module 2.

The arrangement of the protrusion 4 on the battery pack module 2 and the socket on the base 44 described above is optional and other arrangements can be employed. For instance, the socket can be on the battery pack module 2 and the protrusion 4 can be on the base 44. Further, the battery pack module(s) 2 and base 44 need not employ threads and other structures for attaching the battery pack module 2 and the base 44 can be employed. Additionally or alternatively, the terminals on the battery pack module and the electrical contacts can have different structures. For instance, the protrusion 4 can include two parallel prongs that serve as the terminals. The prongs can be received in openings or sockets on the base 44.

The temperature control device 52 can be associated with each battery pack module 2, with a portion of the battery pack modules 2 or can be common to all of the battery pack modules 2. Suitable temperature control devices include devices for cooling and/or heating of the battery pack modules. For instance, a cooling plate can serve as the temperature control device 52. The cooling plate can be associated with each battery pack module 2, with a portion of the battery pack modules 2 or can be common to all of the battery pack modules 2. A cooling plate 52 can absorb and disperse heat from the battery pack modules 2. The heat can be transferred from a battery pack module 2 to the cooling plate 52 through the regions of the battery pack module 2 that contact the cooling plate 52. For instance, FIG. 3B illustrates the bottom of the battery pack module 2 in contact with the upper surface of the temperature control device 52. As a result, heat can be transferred from the battery to the temperature control device 52 through the bottom of the battery pack module 2. Suitable materials for a cooling plate 52 include, but are not limited to, metals such as aluminum, and/or copper, composite metals having metal mixed with plastics, and non-metals such as carbon fiber.

When a cooling plate serves as the temperature control device, one or more conduits 63 can extend through the cooling plate for carrying cooling fluid through the cooling plate. The fluid can include or consist of a liquid and/or a vapor. The cooling fluid can serve to carry heat from the cooling plate. Additionally or alternately, one or more conduits such as a metal tube or pipe can be positioned adjacent to the cooling plate. The conduit can contact the cooling plate in order to generate heat transfer between the cooling plate and the cooling fluid in the conduit. In some instances, the case also holds a reservoir for the cooling fluid and/or a pump for transporting the cooling fluid into and out of the conduit. Alternately, the reservoir and/or pump are positioned outside of the case.

Figure 3C:
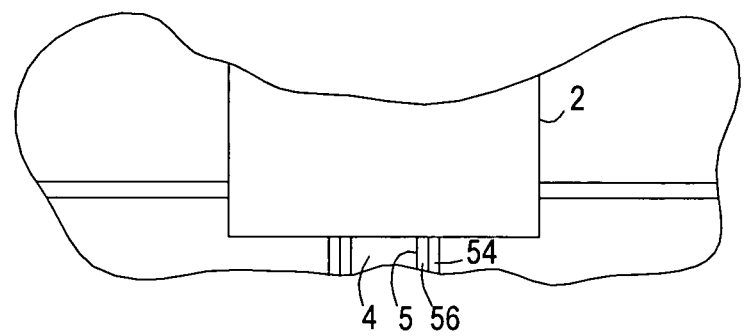

FIG. 3C is a cross section of the battery pack system 42 illustrating the interface between a battery pack module 2 and the base 44. The cooling plate 52 includes a recess 63 configured to receive the bottom of the battery pack module 2. As a result, at least a portion of the lateral side(s) of the battery pack module 2 can be in contact with the cooling plate 52. The contact between the lateral side(s) of the battery pack module 2 and the cooling plate 52 can enhance the efficiency of heat transfer between the battery pack module 2 and the base 44.

Although the temperature control device is disclosed in the context of a cooling plate, the plate can also serve as a heating plate. For instance, a fluid that elevates the temperature of the battery pack modules can be used in the conduits. Alternately, resistive wires or coils that heat upon application of an electrical current can be employed as the temperature control device.

The electronics 62 can control the temperature control device. For instance, the electronics 62 can control a pump in order to control the flow of fluid through the conduits. As another example, the electronics can control the flow of current through resistive wires that serve as the temperature control device. In some instances, the electronics control the temperature control device in response to output from one or more temperature measuring devices in each of the battery pack modules.

Figure 4A:
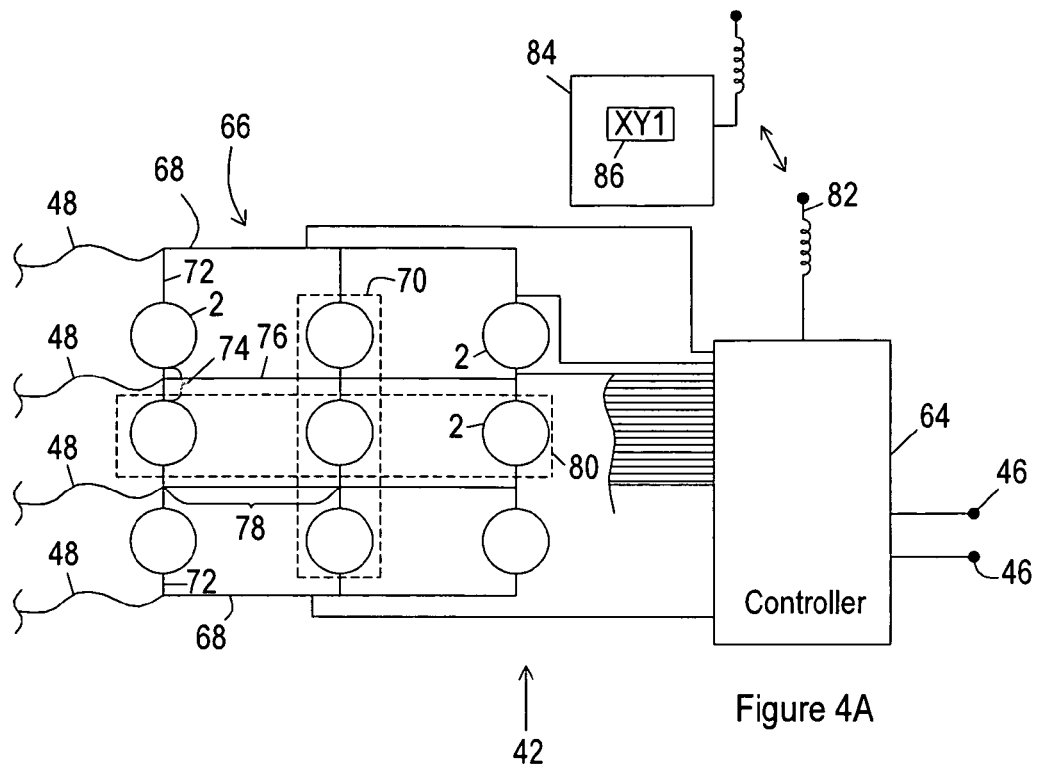
FIG. 4A is a schematic diagram illustrating the relationship between the electronics in the base and the battery pack modules of a battery pack system. The battery pack system includes a controller in electrical communication with a pack assembly. The battery pack assembly includes battery pack modules arranged in parallel groups that are connected in series.

FIG. 4A is a schematic diagram illustrating the relationship between the electronics 62 in the base 44 and the battery pack modules 2. The battery pack system 42 includes a controller 64 in electrical communication with a pack assembly 66, and the terminals 46 disclosed in FIG. 3A. In order to simplify the illustration, the connection between the controller 64 and a battery pack module 2 is illustrated for only one of the battery pack modules 2. In some instances, the illustrated connections are repeated for each of the battery pack modules 2.

The pack assembly 66 includes two primary parallel conductors 68 that connect three system series groups 70 in parallel. The system series groups 70 each include three battery pack modules 2 connected in series. Primary series conductors 72 each provide electrical communication between a system series group 70 and a primary parallel conductor 68 and secondary series conductors 74 provide electrical communication between the battery pack modules 2 connected in series. The electrical conductors 60 of FIG. 3B can each serve as a primary series conductor 72, a secondary series conductor 74, a portion of a primary series conductor 72, or a portion of a secondary series conductor 74.

The pack assembly 66 also includes a plurality of secondary parallel conductors 76. The secondary parallel conductors 76 each include one or more cross conductors 78 that provide electrical communication between the secondary series conductors 74 in different system series groups 70. Accordingly, each secondary parallel conductor 76 provides a parallel connection between the battery pack modules 2 in different system series group 70. For instance, each secondary parallel conductor 76 provides electrical communication between different system series groups 70 such that a battery pack module 2 in one of the system series groups 70 is connected in parallel with a battery pack module 2 in the other system series groups 70. Because a single secondary parallel conductor 76 only provides one of the parallel connections, another connection is needed to connect battery pack modules 2 in parallel. The other parallel connection can be provided by another secondary parallel conductor 76 or by a primary parallel conductor 68. Each of the battery pack modules 2 connected in parallel belongs to a system parallel group 80. Accordingly, the pack assembly 66 of FIG. 4A includes three system parallel groups 80.

The pack assembly 66 of FIG. 4A can be scaled to include more battery pack modules 2 or fewer battery pack modules 2. For instance, the system can include four or more battery pack modules 2, twelve or more battery pack modules 2, twenty-five or more battery pack modules 2, eighty-one or more battery pack modules 2, one hundred or more battery pack modules 2. The number of battery pack modules 2 in each system parallel group 80 can be the same or different from the number of battery pack modules 2 in each system series group 70. The number of battery pack modules 2 in each system series group 70 can be increased in order to increase the voltage of the system or decreased in order to decrease the voltage of the system. Each system series group 70 can include two or more battery pack modules 2; four or more battery pack modules 2; more than eight battery pack modules 2; or fifteen or more battery pack modules 2. The number of system series groups 70 can be increased for applications that require higher power levels or decreased for applications that require lower power levels. In some instances, the pack assembly 66 includes one or more system series groups 70 and one or more system parallel groups. In one embodiment, the pack assembly includes only one system parallel group and no series groups. The pack assembly can include two or more system series groups 70; four or more system series groups 70; ten or more system series groups 70; or fifteen or more system series groups 70.

Although FIG. 4A illustrates the secondary parallel conductors 76 providing electrical communication between the system series groups 70 such that a battery pack module 2 in one of the system series groups 70 is connected in parallel with a battery pack module 2 in each of the other system series groups 70, the secondary parallel conductors 76 can provide electrical communication between the system series groups 70 such that a battery pack module 2 in one of the system series groups 70 is connected in parallel with a battery pack module 2 in a portion of the other system series groups 70.

One or more of the parallel conductors 68 can optionally be connected to a system connector 48. For instance, FIG. 4A illustrates each of the parallel conductors 68 in electrical communication with a system connector 48. These connections permit the pack assembly 66 to be optionally connected in parallel with the pack assembly 66 of another battery pack system 42. Alternately, these connections can permit each of the system parallel groups 80 to be connected in parallel with a system parallel group 80 in the pack assembly 66 of another battery pack system 42. The battery pack systems 42 can be cascaded so a plurality of battery pack systems 42 can be connected to a single battery pack system 42.

The pack assembly 66 can include electrical connections between the primary parallel conductors 68 other than the electrical connections shown in FIG. 4A. For instance, other battery pack modules 2 and/or system series groups 70 can be connected between the primary parallel conductors 68 but not otherwise electrically connected to the illustrated system series groups 70. Further, the pack assembly 66 can include other components. For instance, the pack assembly 66 can include fuses positioned such that if a battery pack module 2 shorts, the battery pack module 2 is no longer in electrical communication with the rest of the battery pack modules 2 in the pack assembly 66. For instance, a fuse can be associated with each battery pack module 2 and placed in series with the associated battery pack module 2. Accordingly, the fuses can prevent a battery pack module 2 that shorts in a system parallel group 80 from shorting the other battery pack module 2 in the system parallel group 80. Suitable fuses include, but are not limited to, traditional fuse devices and/or bi-metal switches.

The controller 64 is configured to control and/or monitor the discharge and charge of the pack assembly 66. Suitable controllers 64 can include firmware, hardware and software or a combination thereof. Examples of suitable controllers 64 include, but are not limited to, analog electrical circuits, digital electrical circuits, processors, microprocessors, digital signal processors (DSPs), computers, microcomputers, ASICs, and discrete electrical components, or combinations suitable for performing the required control functions. In some instances, the controller 64 includes one or more memories and one or more processing units such as a CPU. The one or more memories can include instructions to be executed by the processing unit during performance of the control and monitoring functions.

The controller 64 can include charging electronics for charging the battery pack modules 2. The controller 64 can be configured to recharge each of the battery pack modules 2 individually by applying a potential across the battery pack modules 2 individually. Additionally or alternately, the controller 64 can be configured to recharge the pack assembly 66 by applying a potential across the pack assembly 66. Although not illustrated, the controller 64 can include or be attachable to a power source that provides power for charging the pack assembly 66.

U.S. Patent Application Ser. No. 60/740,150, filed on Nov. 28, 2005, entitled "Battery System Configured To Survive Failure of One or More Batteries," and U.S. patent application Ser. No. 11/501,095, filed on Aug. 8, 2006, entitled "Battery System Configured To Survive Failure of One or More Batteries," are each incorporated herein in their entirety and disclose a method for charging and discharging a battery pack module 2 having a battery system 10 constructed according to FIG. 1D or FIG. 1F such that the battery pack module 2 can survive failure of one or more batteries without a substantial drop in the capacity in the battery pack module 2. The controller 64 can charge and discharge the battery pack modules 2 in accordance with this disclosure. Additionally, the disclosure of this Patent Application can be adapted to charging and discharging the pack assembly 66. As a result, the controller 64 can charge and discharge a pack assembly 66 in accordance with this disclosure.

The controller 64 can include system protection electronics that monitors the charging and recharging of the pack assembly 66 so as to detect fault conditions in the pack assembly 66. One example of a fault condition is application of excessive and potentially damaging voltage to one or more battery pack modules 2 while recharging the pack assembly 66. For instance, a fault condition can occur by applying a voltage exceeding a threshold voltage across a battery pack module 2, across one of the system parallel groups 80 and/or across the pack assembly 66.

Another example of a fault condition includes applying excessive and potentially damaging current to one or more battery pack modules 2 during the charge of the pack assembly 66. For instance, a fault condition can occur by applying a current exceeding a threshold current across a battery pack module 2, across one of the system parallel groups 80 and/or across the pack assembly 66. Another example of a fault condition includes allowing the potential of one or more battery pack modules 2 to fall to a level that would damage the function and/or rechargeability of the battery pack module 2. For instance, a fault condition can occur by discharging the pack assembly 66 until the voltage across one or more of the battery pack modules 2 falls below a voltage threshold.

In the event of a fault condition, the system protection circuit can stop the current flow through the pack assembly 66. For instance, the controller 64 can include a switch that stops current flow through the pack assembly 66 when the switch is open. The controller 64 can open the switch in the event a fault condition occurs. A suitable switch includes, but is not limited to, a field-effect transistor (FET) or a relay switch in the case of high power applications.

In some instances, the controller 64 includes a transmitter 82 or transceiver that can be employed to transit information to a remote unit 84. The remote unit 84 can have one or more status indicators 7 for communication information about the battery pack system 42 to a user. In some instances, the remote unit 84 includes a display 86. In the event that a fault condition occurs, the remote unit 84 can communicate the serial number or other type of identifier for the battery pack module 2 to which the fault condition applies to the operator. The operator can then go the battery pack system 42 and identify the faulty battery pack module 2. In instances where a status indicator 7 on the faulty battery pack module 2 indicates the faulty condition of the battery pack module 2, the serial number or other type of identifier may not be necessary to identify the faulty battery pack module 2.

The battery pack system 42 can include electronics in addition to the electronics 62 illustrated in FIG. 4A. For instance, the battery pack module 2 can include electronics for charging the pack assembly 66 by applying a potential across the pack assembly 66. As a result, the battery pack system 42 may require additional connections between the controller 64 and the pack assembly 66. Additionally, the battery pack module can include ammeters and/or voltmeters as needed to perform the above functions.

In some instances, the battery pack modules 2 in a pack assembly 66 can be different from one another. For instance, a portion of the battery pack modules 2 can be high power sources and a portion of the battery pack modules 2 can be low power sources. A high power source has a mass based power density that is more than the mass based power density of the low power sources. Additionally or alternatively, the low power sources can have an impedance that is more than three times the impedance of the high power sources. Additionally or alternately, a low power source can have a capacity that is more than the capacity of a high power source. In some instances, the high power sources have a mass based power density that is more than twice the mass based power density of the low power sources before discharge of the battery system 10 or that is more than four times the mass based power density of the low power sources before discharge of the battery system 10. Additionally or alternately, in some instances, at least one low power source has a capacity that is greater than a capacity of at least one high power source or that is greater than 1.2 times the capacity of at least one high power source.

Figure 4B:
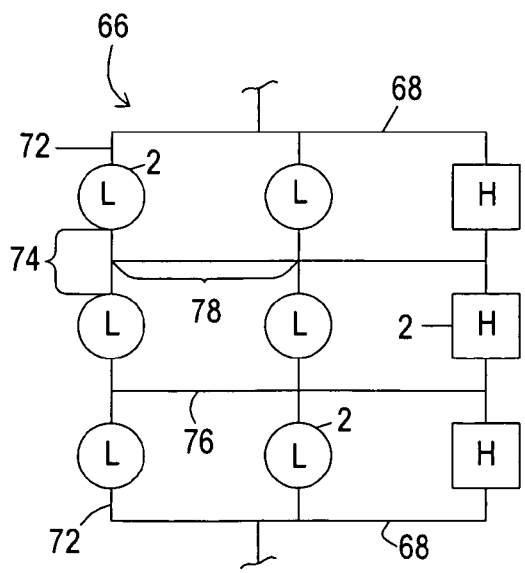
FIG. 4B is a schematic for a pack assembly where each system parallel group includes one or more high power sources illustrated by the battery pack modules labeled H and one or more low power sources illustrated by the battery pack modules labeled L.

Each system parallel group 80 can includes one or more high power sources and one or more low power sources. The battery pack modules 2 can be arranged such that one or more system series groups 70 include only high power sources and one or more system series groups 70 include only low power sources. For instance, FIG. 4B is a schematic for a pack assembly 66 with one system series group 70 that employs only high power sources as illustrated by the battery pack modules 2 labeled H and two system series groups 70 that employ only low power sources as illustrated by the battery pack modules 2 labeled L. In one example, the pack assembly 66 has only one parallel group that includes one or more high power sources and one or more low power sources. Since the high power sources can have a mass based power density that is more than the mass based power density of the low power sources and the low power sources can have an impedance that is more than the impedance of the high power sources, the current can flow primarily from the high power sources during high power applications such as pulsing. When the power demands on the battery system 10 drops, the portion of the current provided by the low power sources increases. During the high power application, the low power sources will have discharged less energy than the high power sources. As a result, the high power sources will be associated with a higher voltage drop than the low power sources. However, because the parallel lines maintain the power sources in the same parallel group at the same voltage, the low power sources will recharge the high power sources. This arrangement permits the battery assembly to repeatedly satisfy the requirements of high power applications and low power applications.

The controller 64 can be configured to identify whether a high power source or a low power source has been placed in a particular location on the base. In some instances, the low power sources and the high power sources have the same general shape. As a result, an operator may mistakenly attach a battery pack module 2 to the base in the wrong location. For instance, an operator may place a high power source in a socket for a low power source. The controller 64 can identify the error and provide an error message to the operator on the remote unit 84. The error message can identify the battery pack module 2 that is misplaced to the operator. For instance, the remote unit 84 can display the serial number or other type of identifier for the misplaced battery pack module 2.

Figure 4C:
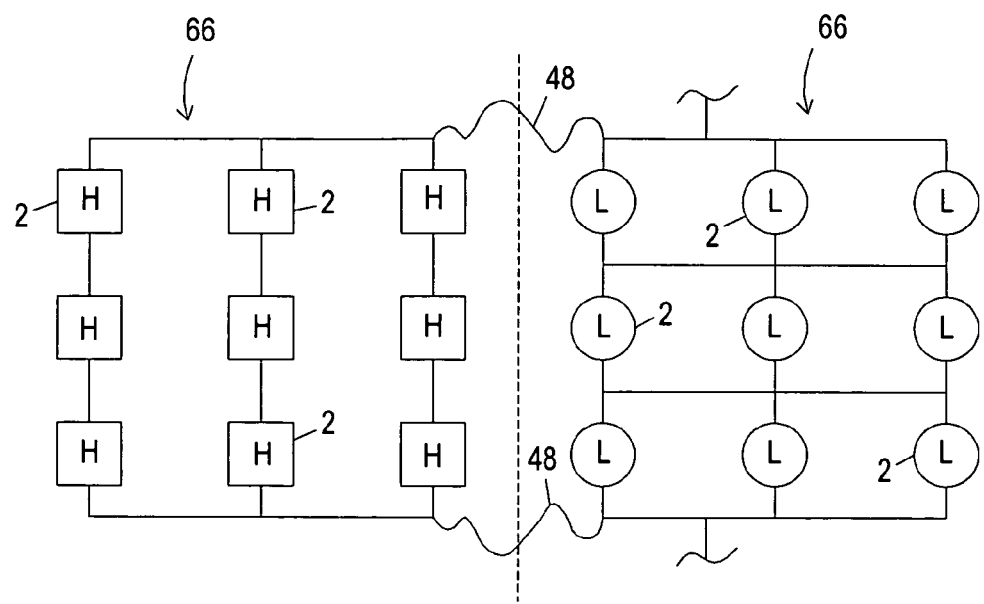
FIG. 4C is a schematic for a pack assembly of one battery pack system connected in parallel with a pack assembly of another battery pack system. One pack assembly includes only high power sources labeled H and the other packs assembly includes only low power sources labeled L.

As noted above, the system connectors 48 of FIG. 3A can be employed to connect the pack assembly 66 of one battery pack system 42 with the pack assembly 66 of one or more other battery pack systems 42. The battery pack systems 42 can be the same or different. For instance, FIG. 4C is a schematic for a pack assembly 66 of one battery pack system 42 connected in parallel with a pack assembly 66 of another battery pack system 42. One pack assembly 66 includes only high power sources labeled H and the other packs assembly includes only low power sources labeled L. This arrangement permits the high power sources to be easily changed by detaching the battery pack system 42 with the high power sources and re-attaching another battery pack system 42 with high power sources. Alternately, this arrangement permits the low power sources to be easily changed by detaching the battery pack system 42 with the low power sources and re-attaching another battery pack system 42 with low power sources.

Additional details about the construction and operation of a battery pack module 2 and battery pack systems 42 can be found in U.S. Provisional Patent Application Ser. No. 60/601,285; filed on Aug. 13, 2004; entitled "Battery Pack;" and in U.S. patent application Ser. No. 11/201,987; filed on Aug. 10, 2005; and entitled "Battery Pack;" and in U.S. Patent Application Ser. No. 60/707,500; filed on Aug. 10, 2005; and entitled "Battery System;" and in U.S. Patent Application Ser. No. 60/740,150; filed on Nov. 28, 2005; and entitled "Battery System Configured to Survive Failure of One or More Batteries;" and in U.S. patent application Ser. No. 11/501,095, filed on Aug. 8, 2006, entitled "Battery System Configured to Survive Failure of One or More Batteries;" and in U.S. Patent Application Ser. No. 60/740,204; filed on Nov. 28, 2005; and entitled "Battery Pack System;" and in U.S. Patent Application Ser. No. 60/740,202; filed on Nov. 28, 2005; entitled "Battery Pack System;" and in U.S. patent application Ser. No. 11/269,285; filed on Nov. 8, 2005; and entitled "Modular Battery Pack;" each of which is incorporated herein in its entirety. When possible, the functions of the electronics and/or controllers described in the above applications can be performed in addition to the functions described in this application.

Figure 5:
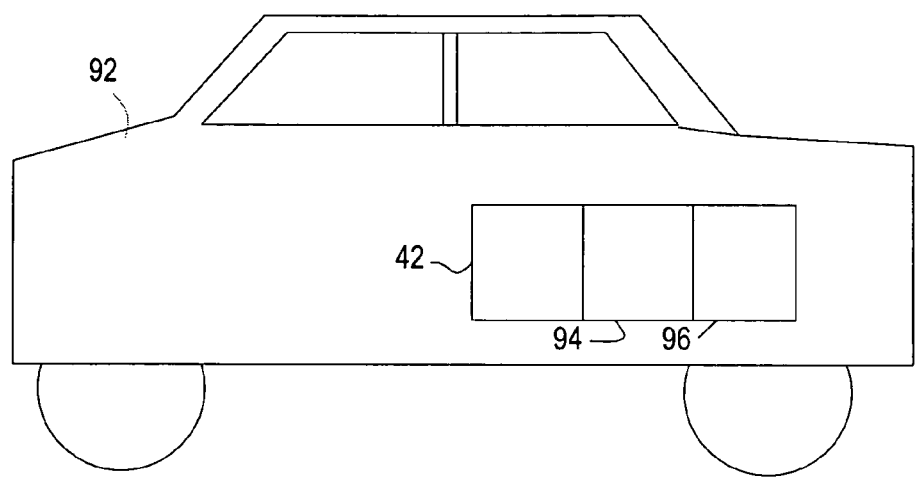
FIG. 5 illustrates a battery pack system employed in a vehicle.

The battery pack system 42 can be employed to power movement of a vehicle. Examples of suitable vehicles are vehicles configured to hold and transport living people such as cars, truck and golf-carts. In some instances, the vehicles, are for transporting people on land. FIG. 5 illustrates a battery pack system 42 employed in a vehicle 92. The battery pack system 42 provides an electrical signal to a power source 94 which is connected to a power train 96. The power train is configured to transmit power from the power source to a drive mechanism (not shown) such as a drive axel. The power source can include a motor and/or engine. The battery system can assist the motor and/or engine in generating movement of the vehicle 92. Alternately, the battery system can be the only source of power provided to the power source. Although the battery pack system 42 is disclosed in the context of a battery for powering vehicles, the battery pack system 42 can be employed in other applications.

Other embodiments, combinations and modifications of this invention will occur readily to those of ordinary skill in the art in view of these teachings. Therefore, this invention is to be limited only by the following claims, which include all such embodiments and modifications when viewed in conjunction with the above specification and accompanying drawings.

The invention claimed is:

1. A battery pack system, comprising:
   a base;
   a plurality of battery pack modules that are each configured to be removably attached to the base,
   each of the battery pack modules housing batteries, each battery pack module including a plurality of parallel groups connected in series, each parallel group including a plurality of the batteries connected in parallel;
   wherein the base is configured such that the battery pack modules can be concurrently attached to the base and the base houses electronics that provide electrical connections between the battery pack modules that are concurrently attached to the base; and wherein the electronics are configured to connect the battery pack modules in a plurality of system parallel groups that are connected in series, each system parallel group including a plurality of battery pack modules connected in parallel; and wherein the base includes a case having an interior in which the electronics are housed; and wherein the battery pack modules are each configured to be attached to the base such that a portion of the battery pack module is located outside of the case.

2. The system of claim 1, wherein each battery pack module includes electronics for detecting a fault condition in the battery pack module.

3. The system of claim 2, wherein each battery pack module includes one or more status indicators for indicating the fault condition of the battery pack module.

4. The system of claim 1, wherein a plurality of the battery pack modules are high power sources and one or more battery pack modules are low power sources, the high power sources having a mass based power density that is more than the mass based power density of the low power sources.

5. The system of claim 1, wherein the base houses a temperature control device for controlling a temperature of battery pack modules attached to the base and each of the battery pack module include one or more temperature measurement devices.

6. The system of claim 1, wherein the base includes a cooling plate configured to be in contact with each of the battery pack modules upon attachment of the battery pack modules to the base.

7. The system of claim 6, wherein the base includes conduits for carrying a cooling liquid.

8. The system of claim 7, wherein the conduits extend through the cooling plate.

9. The system of claim 1, wherein a fuse is connected in series with one or more of the batteries.

10. The system of claim 9, wherein a fuse is connected in series with each of the batteries.

11. The system of claim 1, wherein each of the batteries includes one or more devices selected from a group consisting of a burst disc, a current interruption device and a positive temperature coefficient resistor.

12. The system of claim 1, wherein the battery pack modules include a plurality of series groups, each series group connects in series a plurality of the batteries, each series group including one of the batteries from each of the parallel groups and each battery that is included in one of the parallel groups being included in one of the series groups.

13. The system of claim 1, wherein the electronics are configured to connect the battery pack modules in a plurality of system series groups, each system series group connects in series a plurality of the battery pack modules, each system series group including one of the battery pack modules from each of system parallel group and each battery pack modules that is included in one of the system parallel groups being included in one of the system series groups.

14. The system of claim 13, wherein the battery pack modules including a plurality of series groups, each series group connects in series a plurality of the batteries, each series group including one of the batteries from each of the parallel groups and each battery that is included in one of the parallel groups being included in one of the series groups.

15. The system of claim 14, wherein a plurality of the battery pack modules are high power sources and one or more battery pack modules are low power sources, the high power sources having a mass based power density that is more than the mass based power density of the low power sources.

16. The system of claim 14, wherein the high power sources having a mass based power density that is more than twice the mass based power density of the low power sources before discharge of the battery system.

17. The system of claim 14, wherein the base houses a controller for controlling the discharge of the battery pack modules that are attached to the base.

18. The system of claim 17, wherein the base includes terminals for in electrical communication with the controller and accessible from outside of the base, the terminals configured to be coupled with a device to be power by the battery pack system.

19. The system of claim 18, wherein each of the battery pack modules includes a protrusion from a housing and each battery pack module including terminals on the protrusion,
the base includes sockets, electrical contacts being positioned in each of the sockets, and
the sockets being configured to receive one of the protrusions such that each of the terminals on the protrusion contacts one of the electrical contacts in the socket.

20. The system of claim 19, wherein the protrusions each include threads that are complementary to threads in the sockets.

21. The system of claim 4, wherein the high power sources having a mass based power density that is more than twice the mass based power density of the low power sources before discharge of the battery system.

* * * * *